United States Patent
Ben-Harrush et al.

(10) Patent No.: US 9,620,072 B2
(45) Date of Patent: Apr. 11, 2017

(54) METHOD AND APPARATUS FOR REDUCING POWER CONSUMPTION OF AN ELECTRONIC DISPLAY

(75) Inventors: Idan Ben-Harrush, Givat Elah (IL); Rafael E. Diaz, Caesarea (IL); Nicholas Duane Fifer, New York, NY (US); Itzhack Goldberg, Hadera (IL); Dan Ramon, Yokne'am Ilit (IL); Amir Sasson, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1679 days.

(21) Appl. No.: 12/354,742

(22) Filed: Jan. 15, 2009

(65) Prior Publication Data

US 2010/0180228 A1 Jul. 15, 2010

(51) Int. Cl.
| | |
|---|---|
| *G09G 3/36* | (2006.01) |
| *G06F 3/0481* | (2013.01) |
| *G06F 3/0488* | (2013.01) |
| *G06F 3/0482* | (2013.01) |
| *G06F 1/32* | (2006.01) |
| *G09G 5/14* | (2006.01) |

(52) U.S. Cl.
CPC ......... *G09G 3/3677* (2013.01); *G06F 1/3218* (2013.01); *G06F 1/3265* (2013.01); *G06F 3/0481* (2013.01); *G06F 3/0482* (2013.01); *G06F 3/0488* (2013.01); *G06F 3/04886* (2013.01); *G09G 3/3688* (2013.01); *G09G 5/14* (2013.01); *G09G 2300/0426* (2013.01); *G09G 2310/027* (2013.01); *G09G 2310/0286* (2013.01); *G09G 2310/0291* (2013.01); *G09G 2310/0294* (2013.01); *G09G 2310/04* (2013.01); *G09G 2330/021* (2013.01); *Y02B 60/1242* (2013.01)

(58) Field of Classification Search
CPC .. G06F 3/0481; G06F 3/0482; G06F 3/04886; G06F 3/0488
USPC .......................................... 715/803; 345/102
See application file for complete search history.

(56) References Cited

U.S. PATENT DOCUMENTS

| | | | |
|---|---|---|---|
| 4,247,925 A | | 1/1981 | Meshi et al. |
| 5,051,739 A * | | 9/1991 | Hayashida et al. ............. 345/90 |
| 5,822,599 A * | | 10/1998 | Kidder et al. ................ 713/324 |
| 5,881,299 A * | | 3/1999 | Nomura et al. .............. 713/324 |
| 5,890,799 A * | | 4/1999 | Yiu et al. ...................... 713/321 |
| 5,892,511 A * | | 4/1999 | Gelsinger et al. ............. 715/794 |
| 5,920,316 A * | | 7/1999 | Oran et al. .................... 715/779 |
| 6,714,016 B2 * | | 3/2004 | Odaohhara et al. .......... 324/427 |
| 6,788,277 B2 | | 9/2004 | Kanauchi et al. |
| 7,552,349 B2 * | | 6/2009 | Hassan et al. ................ 713/320 |
| 2002/0147861 A1 * | | 10/2002 | Bui et al. .......................... 710/1 |
| 2002/0175887 A1 | | 11/2002 | Yamazaki |
| 2003/0135288 A1 * | | 7/2003 | Ranganathan et al. ......... 700/22 |
| 2003/0146897 A1 * | | 8/2003 | Hunter .......................... 345/102 |
| 2004/0257316 A1 * | | 12/2004 | Nguyen .......................... 345/87 |

(Continued)

*Primary Examiner* — Tuyetlien T Tran
(74) *Attorney, Agent, or Firm* — Griffiths & Seaton PLLC

(57) ABSTRACT

A method, system, and computer program product for reducing power consumption in a display area of an electronic device is provided. The method includes selecting a first window within the display area to be highlighted using a first input command of a user; locating the first window in the display area; and reducing power to at least portions of the display area not corresponding to the first window.

11 Claims, 6 Drawing Sheets

(56) References Cited

U.S. PATENT DOCUMENTS

| | | | |
|---|---|---|---|
| 2005/0052446 A1* | 3/2005 | Plut | 345/211 |
| 2005/0160302 A1* | 7/2005 | Asakura et al. | 713/320 |
| 2005/0270283 A1* | 12/2005 | Plut | 345/211 |
| 2005/0275651 A1* | 12/2005 | Plut | 345/211 |
| 2006/0001660 A1* | 1/2006 | Plut | 345/211 |
| 2006/0020906 A1* | 1/2006 | Plut | 715/867 |
| 2006/0044261 A1* | 3/2006 | Hsieh | 345/156 |
| 2006/0061597 A1* | 3/2006 | Hui | 345/629 |
| 2006/0087502 A1* | 4/2006 | Karidis et al. | 345/211 |
| 2006/0101293 A1* | 5/2006 | Chandley et al. | 713/300 |
| 2006/0132474 A1* | 6/2006 | Lam | 345/204 |
| 2006/0250385 A1* | 11/2006 | Plut | 345/211 |
| 2006/0294475 A1* | 12/2006 | Holecek et al. | 715/781 |
| 2007/0046618 A1 | 3/2007 | Imai | |
| 2007/0063959 A1* | 3/2007 | Iwabuchi et al. | 345/100 |
| 2007/0126729 A1* | 6/2007 | Yoon et al. | 345/211 |
| 2007/0195022 A1 | 8/2007 | Maede et al. | |
| 2007/0229485 A1* | 10/2007 | Burr et al. | 345/211 |
| 2008/0001898 A1* | 1/2008 | Chang | 345/100 |
| 2008/0225216 A1* | 9/2008 | Shimodaira | 349/143 |
| 2008/0307359 A1* | 12/2008 | Louch | G06F 3/0481 715/835 |
| 2009/0288044 A1* | 11/2009 | Matthews et al. | 715/863 |
| 2010/0214278 A1* | 8/2010 | Miura | 345/212 |

\* cited by examiner

METHOD AND APPARATUS FOR REDUCING POWER CONSUMPTION OF AN ELECTRONIC DISPLAY

BACKGROUND OF THE INVENTION

Field of the Invention

The present invention relates in general to computers, and more particularly to apparatus, method and computer program product embodiments for reducing power consumption in a display area of an electronic device.

Description of the Related Art

Generally, an electronic device, such as a computer system, includes a display panel to provide a visual display of an image, and a computer main body which supports the display panel and is mounted with a variety of hardware devices, such as a microprocessor, a video chip, a hard disk drive (e.g., a CD-ROM drive, a DVD drive, a HD-DVD drive, and a Blu-Ray drive), memory devices and a power supply device configured to supply power to the main body and the display panel. Such a computer system is generally a portable computer, such as a laptop computer, a notebook computer, a palmtop computer, a personal digital assistant (PDA), a mobile device, or the like. Portable computers have a smaller volume and better portability than a desktop computer. As a result, portable computers are widely used by users who frequently travel.

Portable computers are typically supplied with power via a direct-current (DC) power adapter, or alternatively, from a battery. However, batteries only provide a limited charge capacity. As a result, it is difficult to use the portable computer for extended periods, particularly when travelling and away from a DC power source. Therefore, in order to reduce power consumption and therefore the longevity of the battery, a variety of power management methods of managing power have been proposed. One common power management method is to switch the state of power consumption into a low power consumption mode or a hibernation mode, when no signal has been input into the computer system for a predetermined time. Another exemplary method includes installing a power control mode switching unit for controlling power consumption by manually operating the power control mode switching unit. However, these methods have been met with mixed results, at best.

Accordingly, it is desirable to provide systems and methods for improved power consumption in electronic displays. Furthermore, other desirable features and characteristics of the present invention will become apparent from the subsequent detailed description of the invention and the appended claims, taken in conjunction with the accompanying drawings and this background of the invention.

SUMMARY OF THE INVENTION

In one embodiment, by way of example only, a method of reducing power consumption in a display area of an electronic device is provided. The method includes selecting a first window within the display area to be highlighted using a first input command of a user; locating the first window in the display area; and reducing power to at least portions of the display area not corresponding to the first window.

In another embodiment, again by way of example only, an apparatus for reducing power consumption in a display area of an electronic device is provided. The apparatus includes an input device configured to receive a first input command from a user, the first input command identifying a current task window; a power reducing module coupled to the input device and configured to reduce power to at least portions of the display device not associated with the current task window; and a display device coupled to the power reducing module and configured to display the current task window and to obscure the at least portions of the display device not associated with the current task window.

In still another embodiment, again by way of example only, a computer program product reducing power consumption of a display device in a computing environment is provided. The computer program product includes a computer-readable storage medium having computer-readable program code portions stored therein. The computer-readable program code portions include a first executable portion for receiving a selection of a first window within the display area to be highlighted based on a first input command of a user; a second executable portion for locating the first window in the display area; and a third executable portion for reducing power to at least portions of the display area not corresponding to the first window.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Broadly, exemplary embodiments discussed herein provide systems and methods that reduce power consumption in a display device. More particularly, a user may select a window within a display area to which power is maintained, while the power is reduced to other the portions of the display area. In one embodiment, the portions other than the selected window are darkened to achieve an overall reduction in power.

Figure 1:
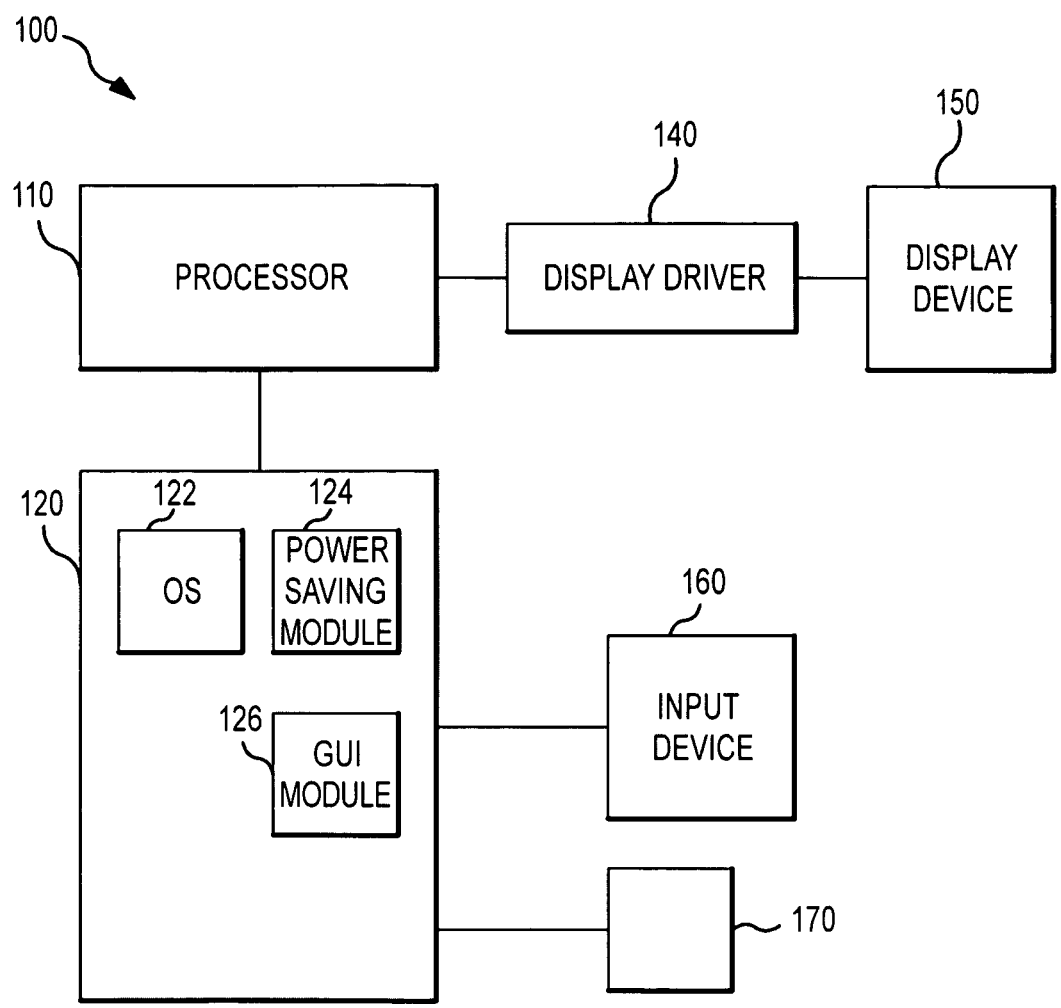
FIG. 1 is a block diagram of a computer system for reducing power consumption of a display device according to an exemplary embodiment.

FIG. 1 hereafter provides an example of computer environment in which the mechanisms of the following embodiments may be implemented. It should be appreciated, however, that FIG. 1 is only exemplary and is not intended to state or imply any limitation as to the particular architectures in which the exemplary aspects of the various embodiments may be implemented. Many modifications to the architecture depicted in FIG. 1 may be made without departing from the scope and spirit of the following description and claimed subject matter.

FIG. 1 illustrates an exemplary electronic device 100, such as a computer, that can be used to implement embodiments of the present invention. The computer 100 includes a processor 110 and a memory 120, such as random access memory (RAM). The computer 100 is operatively coupled to a display 130 via a display driver 140, each of which is discussed in further detail below. The computer 100 may be further include a user input device 150, such a keyboard, a mouse device, and/or touch-screen. Of course, those skilled in the art will recognize that any combination of the above components, or any number of different components, peripherals, and other devices, may be used with the computer 100.

Generally, the computer 100 operates under control of an operating system (OS) 122 (e.g. z/OS, OS/2, LINUX, UNIX, WINDOWS, MAC OS) stored in the memory 120, and interfaces with the user to accept inputs and commands and to present results, for example through the user input device 160 and display device 150 via a graphical user interface (GUI) module 126. Although the GUI module 126 is depicted as a separate module, the instructions performing the GUI functions can be resident or distributed in the operating system 122 or implemented with special purpose memory and processors. The computer 100 also optionally comprises an external data communication device such as a modem, satellite link, Ethernet card, wireless link or other device for communicating with other computers, e.g. via the Internet or other network.

In one embodiment, instructions implementing the operating system 122 and/or other computer programs are tangibly embodied in a computer-readable medium, e.g., data storage device 170, which may include one or more fixed or removable data storage devices, such as a zip drive, hard drive, DVD/CD-ROM, digital tape, etc. Further, the operating system 126 and other computer programs include instructions which, when read and executed by the processor 110, cause the processor 110 to perform the steps necessary to implement and/or use the present invention. As such, the terms "article of manufacture," "program storage device" and "computer program product" as may be used herein are intended to encompass a computer program accessible and/or operable from any computer readable device or media.

Embodiments of the present invention may include one or more associated software application programs 124 that include, for example, a power saving module that functions to reduce power consumption of the display device 150. The power saving module 124 may operate within a single computer 100 or as part of a distributed computer system comprising a network of computing devices. The network may encompass one or more computers connected via a local area network and/or Internet connection (which may be public or secure, e.g. through a VPN connection), or via a fibre channel Storage Area Network or other known network types as will be understood by those skilled in the art.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Figure 2:
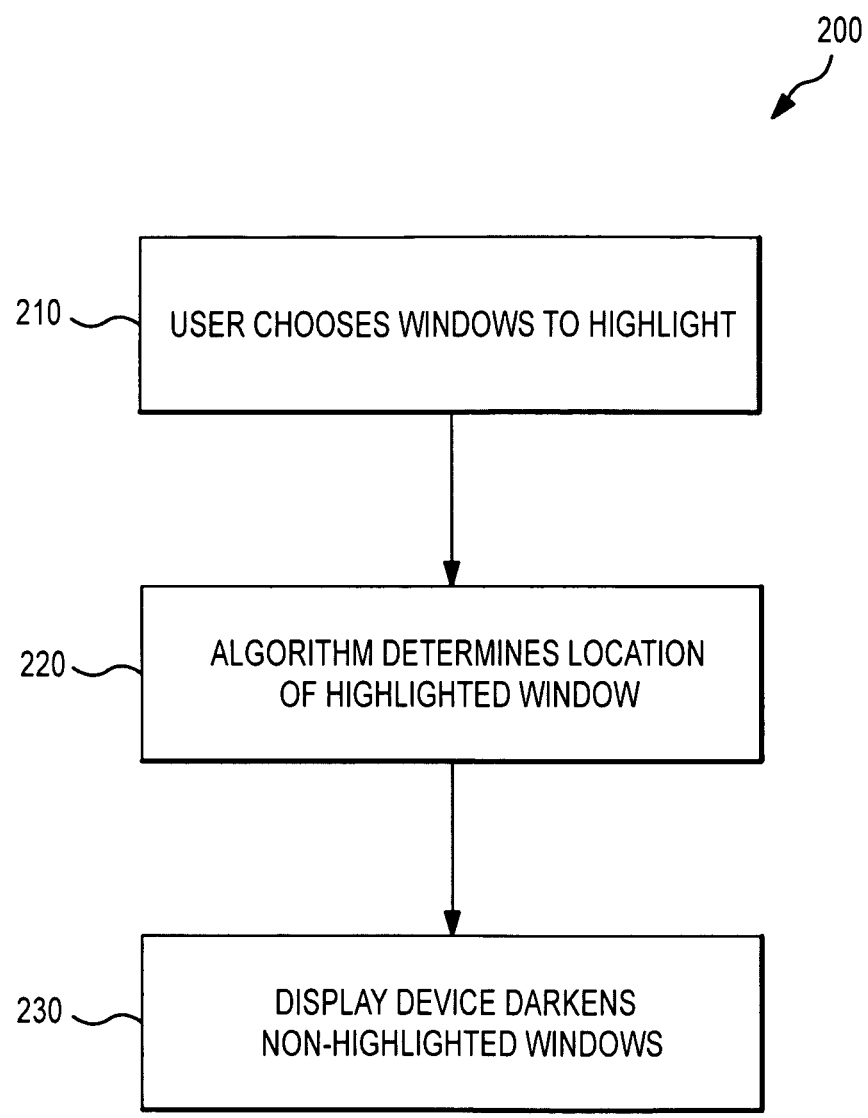
FIG. 2 is a flowchart illustrating a method of reducing power consumption in a display device according to an exemplary embodiment.

Turning to FIG. 2, an exemplary method 200 is depicted for reducing power consumption of an electronic display, such as display device 150. As one skilled in the art will appreciate, various steps in the method 200 may be implemented in differing ways to suit a particular application. In addition, the described method may be implemented by various means, such as hardware, software, firmware, or a combination thereof operational on or otherwise associated with the storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums. The method 200 is described in conjunction with FIG. 3, which is a view of the display device 150 in accordance with an exemplary embodiment.

Figure 3:
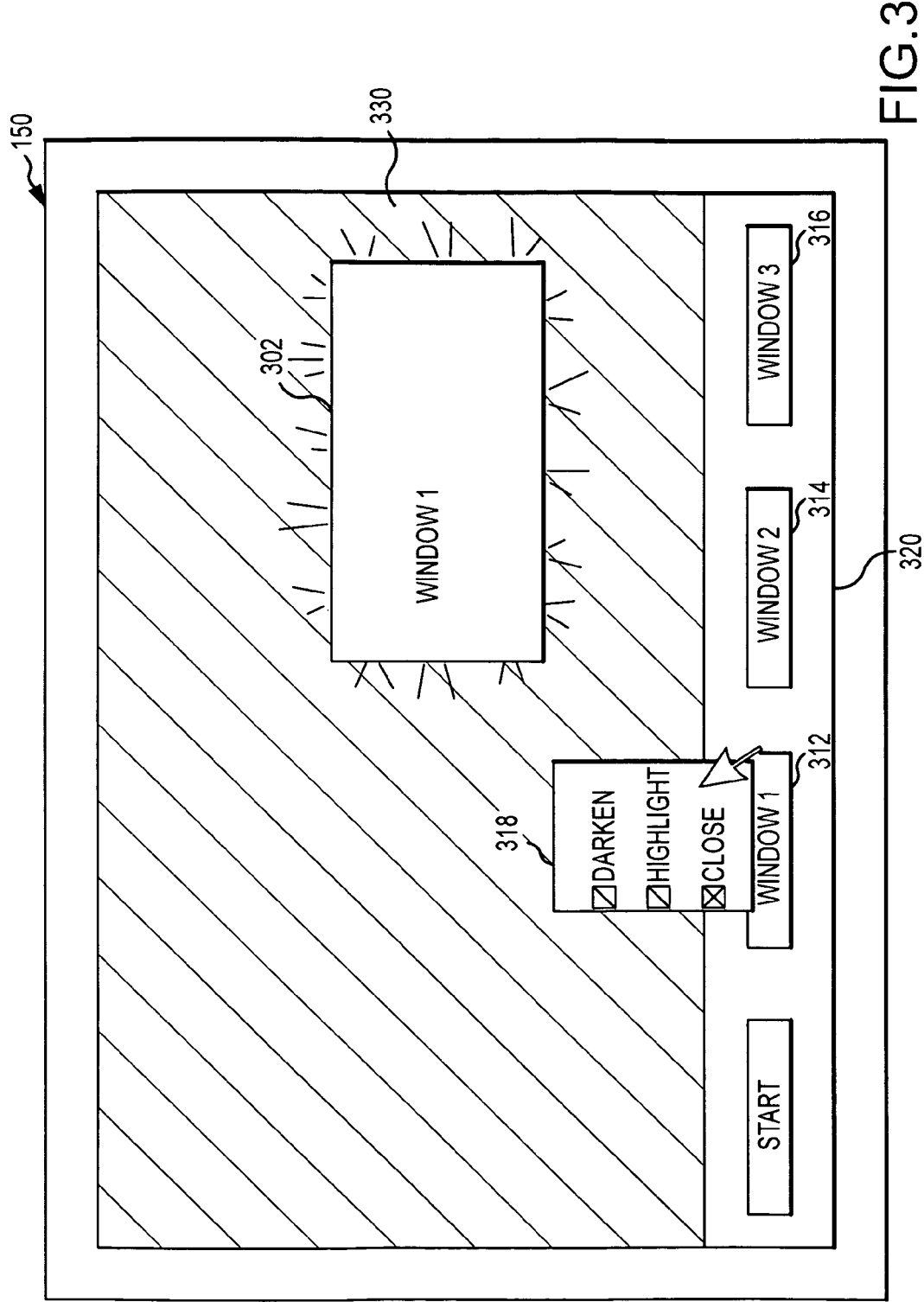
FIG. 3 is a diagram of the display device of the computer system of FIG. 1 according to an exemplary embodiment.

The method 200 is typically implemented in the display device 150 that is running a window-type operating system (e.g., operating system 122) in which a number of windows, including window 302, correspond to a number of window activation buttons 312, 314, 316 in a taskbar 320. The method 200 begins with step 210 in which the user chooses a window to highlight. In the embodiment of FIG. 3, the user wishes to highlight window 312, which for example, can be a current task window in which the user is operating. In this embodiment, the user makes a selection by, for example, selecting "highlight" from a menu 318 at the window activation button 312 corresponding to the window 302 that the user wishes to highlight. The users may also choose to individually darken or un-highlight the windows that the user is not working with, e.g., the windows corresponding to window actuation buttons 314, 316. In alternate embodiment, the selection from the user can be made from a dedicated hotkey on the keyboard and/or screen.

Referring additionally to FIG. 1, in a second step 220 of the method 200, the processor 110 of the computer 100 executes algorithms in the power saving module 124 to identify and locate the selected window (e.g., window 302). In one embodiment, the operating system 122, power saving module 124, and GUI 126 can use an API-type interface to identify and locate the designated window 302.

In a third step 230 of the method 200, the processor 110 sends the appropriate signal to the display driver 140, which in turn, functions to highlight the selected window on the display device 150. In the embodiment shown in FIG. 3, the selected window 302 is highlighted by maintaining power to the window 302, while the other windows corresponding to window actuation buttons 314, 316 are darkened by reducing power to those portions of the display device 150. In general, all portions of the display device 150 are darkened except the window 302, and optionally, the task bar 320. The darkened portions in FIG. 3 are generally referenced as portion 330. Although in this embodiment, the portion 330 is darkened, i.e., black, in other embodiments, the portion 330 may be superimposed in white, depending on relative power consumption of a black screen and white screen and aesthetics. In further steps, the user can selectively darken and/or un-darken the various windows to further darken and/or highlight other portions of the display device 150. For example, two windows can be highlighted at the same time and/or windows can be switched between a darkened state and a highlight or un-darkened state.

As described in further detail below, the darkened portion 330 enables decreased power consumption of the display device because power is not being supplied to those portions. Essentially, only the portions of the display device associated with highlighted window 302 receive power to result in an overall power savings and increased battery life.

Figure 4:
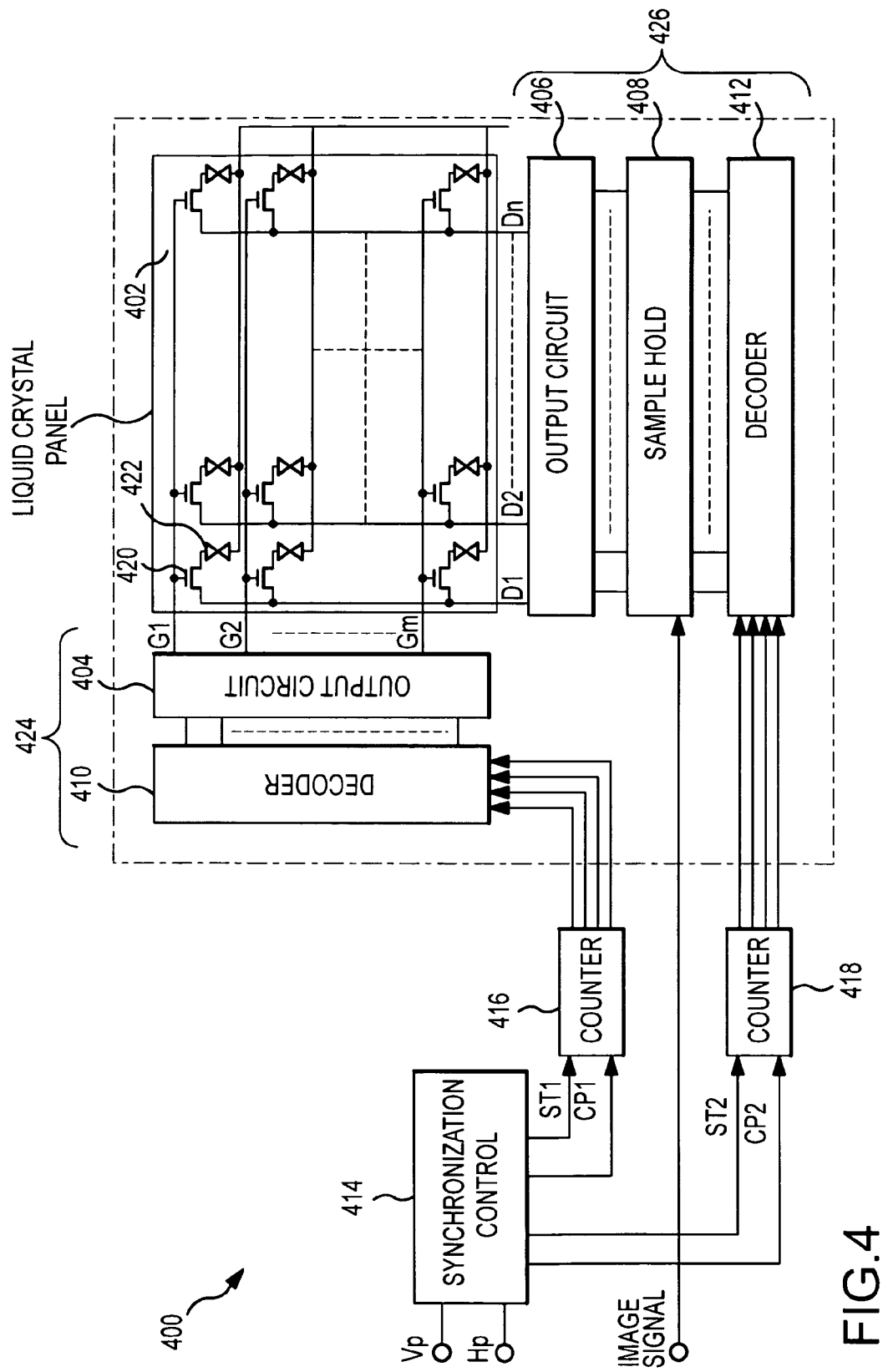
FIG. 4 is a block diagram of a driving circuit for the display device of FIG. 3 according to an exemplary embodiment.

FIG. 4 is a block diagram showing a driving circuit 400 for a liquid-crystal display apparatus with an active matrix liquid-crystal panel 402 to be used, for example, in the display device 150 (FIGS. 1 and 3) according to an exemplary embodiment. In one embodiment, the driving circuit 400 is arranged within the display driver 140 (FIG. 1). The driving circuit 400 includes output circuits 404, 406, a sample holding circuit 408, decoders 410, 412, a synchronization controlling circuit 414, and counters 416, 418.

The active matrix type of liquid-crystal panel 402 has picture elements of n column in the X direction, m row in the Y direction, a TFT (thin film transistor) 420 and a liquid-crystal electrode 422 includes an amorphous silicon (a-Si) of m×n connected into a matrix shape as shown. The respective rows G1, G2, . . . Gm and the respective columns D1, D2, . . . Dn are respectively coupled with row driver 424 and a column driver 426. The row driver 424 includes a decoder 410 and an output circuit 404. The column driver 426 includes of a decoder 412, a sample holding circuit 408 and an output circuit 406. The synchronization controlling circuit 414 generates the first and second start pulses ST1 and ST2 and the first and second clock pulses CP1 and CP2 in accordance with horizontal synchronizing signals Hp and vertical synchronizing signals $V_P$.

The counter 416, which is the first counter, starts the counting operation of the first clock pulses CP1 with the first start pulse ST1 from the synchronization controlling circuit 414 to output the binary count outputs A and B and to output the inversion outputs A and B. The decoder 418 may be a first decoder, which decodes the first counter output to respectively output the pulses that become high sequentially for each of the first clock pulses CP1 to the right and left of each row G1, G2, . . . . The counter 418 may be a second counter, which is adapted to output the binary outputs in accordance with the second start pulse ST2 and the second clock pulse CP2 from the synchronization controlling circuit 414. The decoder 412 may be a second decoder, which decodes the second counter output to output the pulses that become high sequentially for each of the second clock pulses CP2 to each column D1, D2, . . . . The row driver 424 includes the first counter 416, the first decoder 410 and the output circuit 404. The column driver 426 includes the second counter 418, the second decoder 412, the sample holding circuit 408 and the output circuit 406. The first and second decoders 410 and 412, the output circuits 404 and 406, and the sample holding circuit 408 may be formed of the a-Si TFT in the same process and on the same base plate as on the liquid-crystal panel 402.

Figure 5:
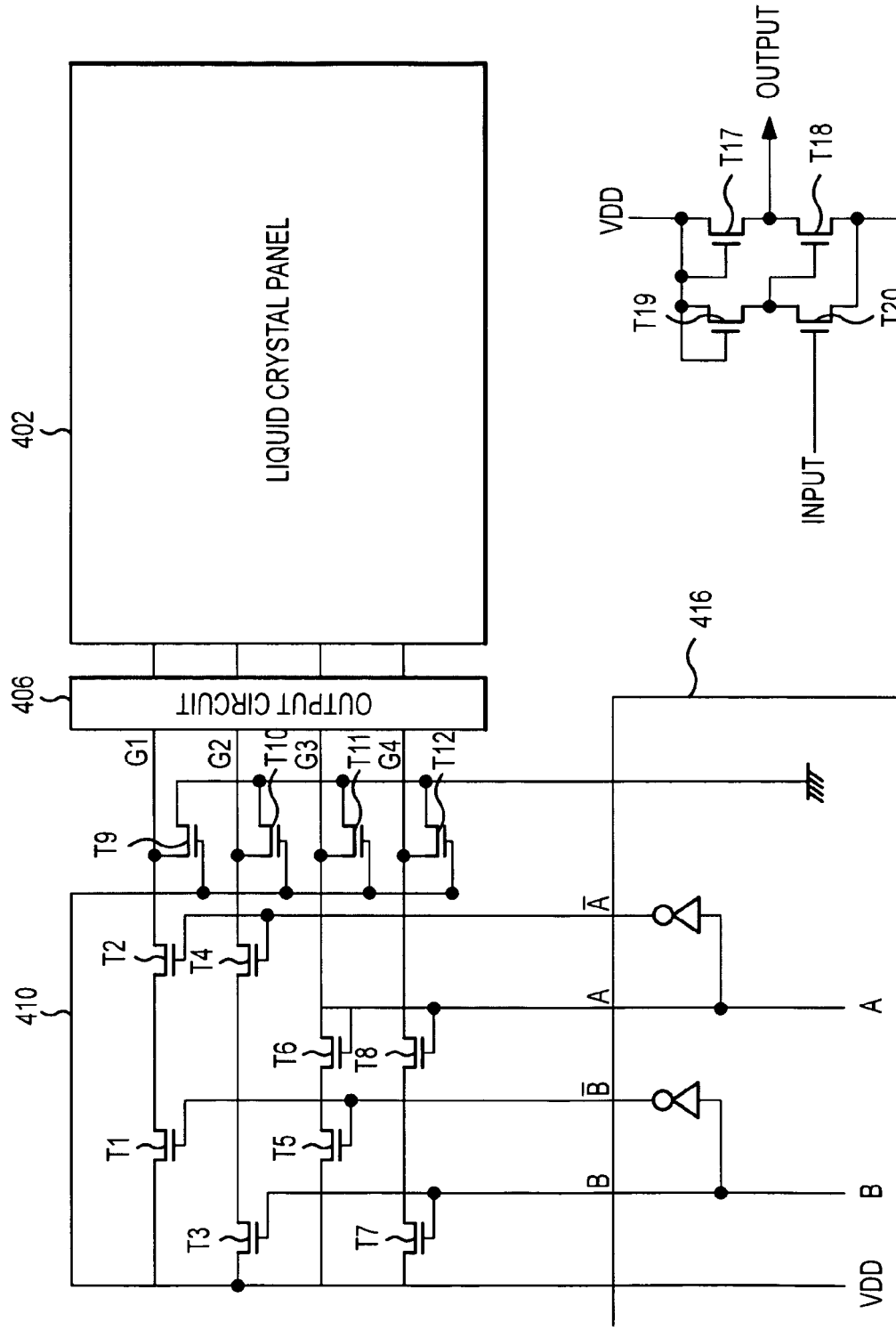
FIG. 5 is a circuit diagram showing an exemplary construction of a first decoder of the driving circuit of FIG. 4.
Figure 6:
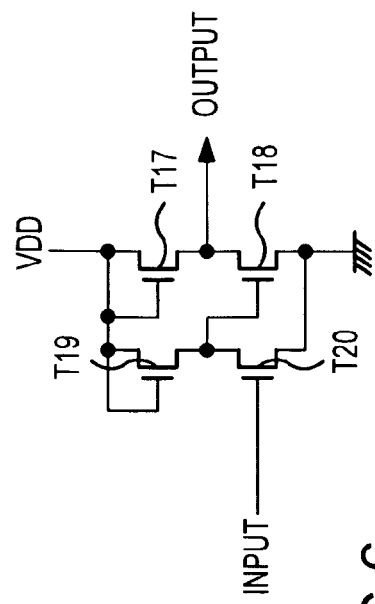
FIG. 6 is a circuit diagram showing an exemplary construction of an output circuit of the driving circuit of FIG. 4.

The circuit of the first decoder and the operation of the row driver will be described with reference to FIG. 5. Each row of the binary count outputs A and B from the first counter 416 and the inversion outputs A and B, and each row G1, G2, . . . are crossed in the matrix shape with two TFTs composing an AND gate being disposed in series in each row. In addition, each row has loads TFT T9 through T12 coupled therewith. The output circuit 406, which has such construction as shown in FIG. 6, is coupled with the outputs for each of the rows.

Now, when the counter output is "00", A and B are both "0", A and B are both "1" to turn on the TFTs T1, T2, T4 and T5, with only the row G1 becoming high. Then, when the counter output is "01", both A and B are "0", both A and B are "1" to turn on the TFTs T2, T3, T4 and T7, with the row G2 becoming high. Upon sequential increment of the counter output like this, the next row becomes sequentially high so as to be selected and to be amplified in reversion in the output circuit of the next stage, and thus the TFTs within the liquid-crystal panel of this row. When the driving operation of all the rows is completed, and the first counter 416 is reset by the next start signal, the scanning operation of the next frame is started.

Figure 7:
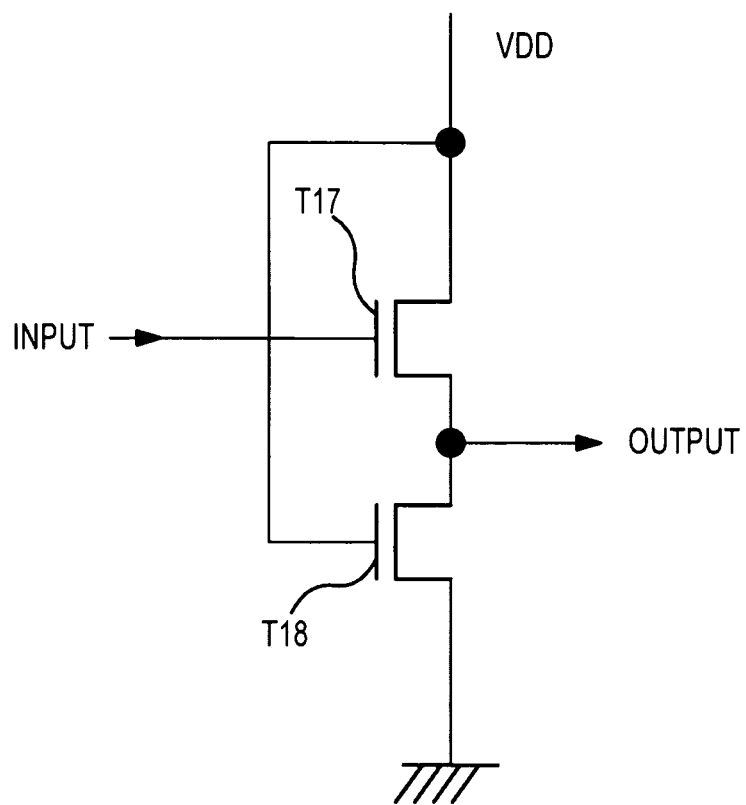
FIG. 7 is a circuit diagram of one row portion of the output circuit of FIG. 6 in accordance with an exemplary embodiment.

FIG. 7 shows a circuit diagram of one row portion of the output circuit in the present embodiment. A first FET T17 for amplification and a second FET T18 for loading are longitudinally coupled between the power supply $V_{DD}$ and ground, the gate of the second FET T18 being coupled with the power supply $V_{DD}$. The input signal is applied upon the gate of the first FET T17 so that the output signal is output from the connection point between the first and second FETs T17 and T18. With the circuit of FIG. 7, when the input signal is high, the first and second FETs T17 and T18 are turned on, thus the output becomes high. At this time, the current does flow to the output gate circuit constituted by the first and second FETs T17 and T18.

On the other hand, when the input signal is low, the first and second FETs T17 and T18 are turned off, thus resulting in the low output. At this time, the current does not flow into the output gate of the first and second FETs. Accordingly, in the present embodiment, the current flows to the output circuit of one row portion selected from among two hundred forty rows, but the current does not flow at all to the output circuit of the other two hundred thirty-nine rows. In the above-described embodiments, the present invention is applied only upon the row driver, although it may also be applied to the column driver. According to the embodiments, the power consumption in the driving circuit may be considerably reduced. As such, this exemplary driving circuit enables the display device 150 to individually maintain power or reduce power to particular windows of the display area, as discussed above, to achieve an overall reduction in power consumption. Exemplary embodiments discussed herein are particularly useful for mobile computer systems, including lap top computers, cell phones, PDAs, smart phones, and similar devices.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method of reducing power consumption in a display area of an electronic device, the method comprising the steps of:

selecting a first window that is a current task window within the display area to be highlighted using a first input command of a user generated from a pop-up menu, the pop-up menu activated from a dedicated keyboard hotkey and having an option for the first input command to be darkening, highlighting, and closing from a window activation button in a task bar, the window activation button corresponding to the first window and including the option in the pop-up menu for the first input command of darkening, highlighting, and closing;

identifying and locating the first window in the display area;

maintaining power to the first window that is selected; and maintaining power to the task bar within the display area while reducing power to all portions of the display area not corresponding to the first window; wherein the reducing power includes superimposing all the portions of the display area not corresponding to the first window in a white color.

2. The method of claim 1, wherein the reducing power step includes reducing power to a second window.

3. The method of claim 1, further comprising restoring power to the at least portions of the display area based on a second input command of the user.

4. The method of claim 1, wherein the reducing power step includes blacking out the at least portions of the display area not corresponding to the first window.

5. An apparatus for reducing power consumption in a display area of an electronic device, the apparatus comprising:

an input device configured to receive a first input command generated from a pop-up menu, the pop-up menu activated from a dedicated keyboard hotkey and having an option for the first input command to be darkening, highlighting, and closing from a window activation button by a user, the first input command in the pop-up menu identifying a first task window which is a current task window and the window activation button corresponding to the current task window and the window activation button including an option in the pop-up menu for the first input command of darkening, highlighting, and closing;

a power reducing module coupled to the input device and configured to:

identify and locate the first window in the display area, maintain power to the task bar within the display area while reducing power to all portions of the display device not associated with the current task window; wherein the reducing power includes superimposing all the portions of the display area not corresponding to the first window in a white color, and maintain power to the first window that is selected; and a display device coupled to the power reducing module and configured to display the current task window and to obscure the at least portions of the display device not associated with the current task window.

6. The apparatus of claim 5, wherein the input device is configured to receive a second input command, and the power reducing module is configured to restore power to the at least portions of the display area based on the second input command.

7. The apparatus of claim 5, further comprising a driving circuit coupled between the power reducing module and the display device, the display device comprising a panel with a plurality of picture elements disposed in a matrix shape, said driving circuit comprising:

a circuit generating pulses which sequentially shift in a synchronous relation with clock pulses to sequentially select, at a period of the clock pulse of a given frequency, respectively each row and each column of the panel; and an output circuit amplifying the pulses to output to said panel, said output circuit including a first FET in which said pulses are input to a gate, and a second FET connected in series with the first FET and in which signals opposite in phase to said pulses are to be input to a gate, so that an output signal is output from a connection point of both FETs.

8. The apparatus of claim 5, further comprising a driving circuit coupled between the power reducing module and the display device, wherein the display device comprising an active matrix panel, with a plurality of picture elements being disposed in matrix shape, respective rows and columns of said active matrix panel are respectively selected by a clock pulse of a given frequency to drive each of said picture elements, the driving circuit comprising:

a counter counting said clock pulses and outputting binary count values and inverted binary count values for said respective rows and columns;

a decoder decoding the binary and inverted binary count value from the counter to simultaneously generate a pair of pulses opposite in polarity, said pair of pulses sequentially shifting in a synchronous relation to said clock pulses in each of said respective rows and/or respective columns; and an output circuit including first and second FETs being connected in series, a pair of pulses opposite in polarity being applied respectively upon each gate of each FET, output signals amplified from connection points of both FETs being output to said active matrix panel.

9. The apparatus of claim 5, further comprising a driving circuit coupled between the power reducing module and the display device, wherein the display device comprising an active matrix panel, with a plurality of picture elements being disposed in matrix shape, respective rows and columns of said active matrix panel are respectively selected by clock pulses of a given frequency to drive the respective picture elements, the driving circuit comprising:

a counter counting said clock pulses and outputting binary count values and inverted binary count values; and a pair of decoders are respectively connected at both ends of each of the rows and/or both ends of each of the columns, the decoders decoding the binary and inverted binary count values of the counter to generate pulses, in each of said rows and/or in each of said columns, which sequentially shift in a synchronous relation with said clock pulses, said decoders are formed of a-si thin film transistors.

10. A computer program product for reducing power consumption of a display device in a computing environment, the computer program product comprising a non-transitory computer-readable storage medium having computer-readable program code portions stored therein, the computer-readable program code portions comprising:

a first executable portion for receiving a selection of a first window within the display area to be highlighted based on a first input command of a user, the first input command generated from a pop-up menu, the pop-up menu activated from a dedicated keyboard hotkey and having an option for the first input command to be darkening, highlighting, and closing from a window activation button, the window activation button corresponding to the first window and including the option in the pop-up menu for the first input command of darkening, highlighting, and closing;

a second executable portion for identifying locating the first window in the display area; and a third executable portion for maintaining power to the task bar within the display area while reducing power to at least portions of the display area not corresponding to the first window while maintaining power to the first window that is selected; wherein the reducing power includes superimposing all the portions of the display area not corresponding to the first window in a white color.

11. The computer program product of claim 10, wherein the third executable portion further reduces power to a second window.

* * * * *